(12) United States Patent
Tang et al.

(10) Patent No.: US 10,809,451 B2
(45) Date of Patent: Oct. 20, 2020

(54) BACKLIGHT SOURCE AND LIQUID CRYSTAL DISPLAY

(71) Applicant: BEIJING XIAOMI MOBILE SOFTWARE CO., LTD., Beijing (CN)

(72) Inventors: Lei Tang, Beijing (CN); Zhendong Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/232,294

(22) Filed: Dec. 26, 2018

(65) Prior Publication Data

US 2019/0196092 A1    Jun. 27, 2019

(30) Foreign Application Priority Data

Dec. 27, 2017 (CN) .......................... 2017 1 1449246

(51) Int. Cl.
*F21V 8/00* (2006.01)
*G02F 1/13357* (2006.01)
*G02F 1/1333* (2006.01)

(52) U.S. Cl.
CPC ........... *G02B 6/0068* (2013.01); *G02B 6/009* (2013.01); *G02B 6/0083* (2013.01); *G02F 1/133308* (2013.01); *G02F 1/133615* (2013.01); *G02F 2001/133314* (2013.01)

(58) Field of Classification Search
CPC ...... G02B 6/0023–0031; G02B 6/0066; G02B 6/0068; G02B 6/0073; G02F 1/133509–133512
See application file for complete search history.

(56) References Cited

U.S. PATENT DOCUMENTS

| | | | | |
|---|---|---|---|---|
| 6,948,842 B2 * | 9/2005 | Chang | ................. | G02B 6/0068 362/555 |
| 7,556,415 B2 * | 7/2009 | Hamada | ............... | G02B 6/0068 362/231 |
| 8,371,737 B2 * | 2/2013 | Wang | ................... | G02B 6/0068 362/612 |
| 2007/0253218 A1 * | 11/2007 | Tanabe | ................ | G02B 6/0068 362/612 |

(Continued)

OTHER PUBLICATIONS

Search Report in corresponding European Patent Application No. 18248075.6, dated Mar. 15, 2019, 8 pages.

*Primary Examiner* — Mariceli Santiago
(74) *Attorney, Agent, or Firm* — Arch & Lake LLP

(57) ABSTRACT

A backlight source and a liquid crystal display including the same are provided. The backlight source includes: a first LED light bar, a second LED light bar, a light guide plate, a reflective plate and an optical film, wherein the first LED light bar includes a first circuit board and a plurality of first light emitting units disposed on the first circuit board and spaced evenly, the second light emitting light bar includes a second circuit board and a plurality of second light emitting units disposed on the second circuit board and spaced evenly, the first light emitting units and the second light emitting units are located between the first circuit board and the second circuit board, and the plurality of first light emitting units and the plurality of second light emitting units are alternately disposed in an arrangement direction of the plurality of the first light emitting units.

19 Claims, 5 Drawing Sheets

(56) References Cited

U.S. PATENT DOCUMENTS

| | | | |
|---|---|---|---|
| 2008/0121898 A1* | 5/2008 | Yin | G02B 6/0068 |
| | | | 257/88 |
| 2010/0067256 A1 | 3/2010 | Chang | |
| 2010/0182539 A1 | 7/2010 | Ohyama et al. | |
| 2012/0063167 A1* | 3/2012 | Ozawa | G02B 6/0031 |
| | | | 362/609 |
| 2012/0243258 A1* | 9/2012 | Park | F21V 21/00 |
| | | | 362/612 |
| 2015/0370003 A1* | 12/2015 | Zhu | G02B 6/0073 |
| | | | 362/612 |
| 2018/0113248 A1* | 4/2018 | Park | G02B 6/0083 |

* cited by examiner

BACKLIGHT SOURCE AND LIQUID CRYSTAL DISPLAY

CROSS-REFERENCE TO RELATED APPLICATIONS

The application is based on and claims priority to Chinese patent application No. 201711449246.7, filed on Dec. 27, 2017, the entire content of which is hereby incorporated by reference in its entirety.

TECHNICAL FIELD

The present disclosure relates to the field of display technologies, and particularly to a backlight source and a liquid crystal display.

BACKGROUND

With development of electronic devices, the development of display technology is also accelerating. At present, the display is mainly classified into liquid crystal displays (LCDs) and organic light emitting diode (OLED) displays.

A liquid crystal display includes a display panel and a backlight source for providing a light source for the display panel. The backlight source mainly includes a light emitting diode (LED) light strip, a light guide plate, a reflective plate and an optical film. The light emitted by the LED light bar is incident into the light guide plate from a side surface of the light guide plate, and the light guide plate evenly conducts and distributes the light incident from the side surface to the entire light exiting surface, and then the light is emitted out from the light exiting surface of the light guide plate. The light emitted from the light guide plate enters the display panel after being diffused and brightened by the optical film.

A plurality of light emitting units are disposed on the LED light bar and spaced evenly. Limited to arts and crafts, the interval between adjacent light emitting units is relatively large, so that when the light emitted from the LED light bar enters the light guide plate, apparent dark areas appear, thereby leading to that the light emitted from the backlight source is not even enough, which affects the display effect of the LCD.

SUMMARY

In order to at least partially overcome the problems in the related art that an interval between adjacent light emitting units on the LED light bar is relatively large that leads, when the light emitted out from the LED light bar enters the light guide plate, an apparent dark area appears, the present disclosure provides a backlight source and a liquid crystal display.

According to a first aspect of the present disclosure, a backlight source is provided, which may include: a first LED light bar, a second LED light bar, a light guide plate, a reflective plate and an optical film. The light guide plate has a light exiting surface and a bottom surface disposed oppositely to each other. The optical film is attached to the light exiting surface of the light guide plate. The reflective plate is attached to the bottom surface of the light guide plate. The first LED light bar includes a first circuit board and a plurality of first light emitting units disposed on the first circuit board and spaced evenly, the second light emitting light bar includes a second circuit board and a plurality of second light emitting units disposed on the second circuit board and spaced evenly, the first circuit board and the second circuit board are disposed in parallel with each other and are disposed in parallel with the light exiting surface of the light guide plate, the first light emitting units and the second light emitting units are located between the first circuit board and the second circuit board, and the plurality of the first light emitting units and the plurality of the second light emitting units are alternately disposed in an arrangement direction of the plurality of the first light emitting units.

According to a second aspect of the present disclosure, there is further provided a liquid crystal display including the above backlight source.

It is to be understood that both the foregoing general description and the following detailed description are exemplary and explanatory only and are not restrictive of the present disclosure.

BRIEF DESCRIPTION OF THE DRAWINGS

The accompanying drawings here, which are incorporated in and constitute a part of this specification, illustrate embodiments consistent with the present disclosure, and together with the description, serve to explain the principles of the present disclosure.

DETAILED DESCRIPTION

Exemplary embodiments are illustrated in detail hereinafter, examples of which are shown in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

For ease of understanding, the structure of the backlight source in the related art is described below at first.

Figure 1A:
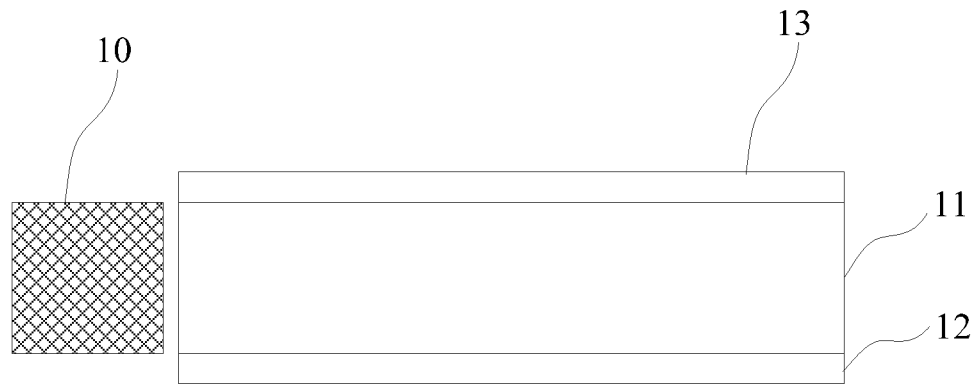
FIG. 1A is a schematic structural view of a backlight source in the related art.

FIG. 1A is a schematic structural view of a backlight source in the related art. As shown in FIG. 1A, the backlight source mainly includes an LED light bar 10, a light guide plate 11, a reflective plate 12, and an optical film 13. The optical film 13 is attached to the light exiting surface of the light guide plate 11, and the reflective plate 12 is attached to the bottom surface of the light guide plate 11. The LED light bar 10 is disposed on the side of the light guide plate 11, and the light emitted by the LED light bar 10 is incident into the light guide plate 11 from a side surface of the light guide plate 11, and the light guide plate 11 evenly conducts and distributes the light incident from the side surface to the entire light exiting surface. The light emitted out from the light guide plate 11 enters the display panel after being diffused and brightened by the optical film 13. The reflective plate 12 functions to reflect the light transmitted through the bottom surface of the light guide plate 11 back, so as to increase the utilization of light.

Figure 1B:
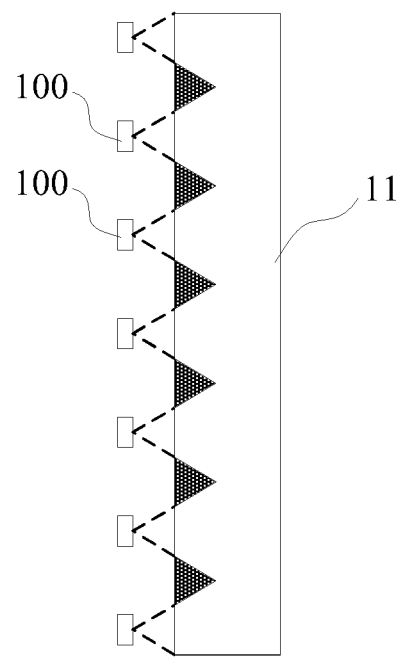
FIG. 1B is a schematic diagram of illumination of an LED light bar in the related art.

As shown in FIG. 1B, a plurality of light emitting units 100 are disposed on the LED light bar 10 and spaced evenly. The light emitting unit 100 is assembled by a Surface Mount Technology (SMT) process. However, limited to arts and crafts, the interval between adjacent two light emitting units 100 on the LED light bar 10 in the related art is relatively large, so that when the light emitted out from the LED light bar 100 enters the light guide plate 11, apparent dark areas (please refer to the shaded portion in FIG. 1B) appears, thereby leading to that the light emitted from the backlight source is not even enough, which affects the display effect of the LCD. In order to solve the above problems in the related art, the present disclosure provides a backlight source, the specific structure of which is described in detail hereinafter.

Figure 2A:
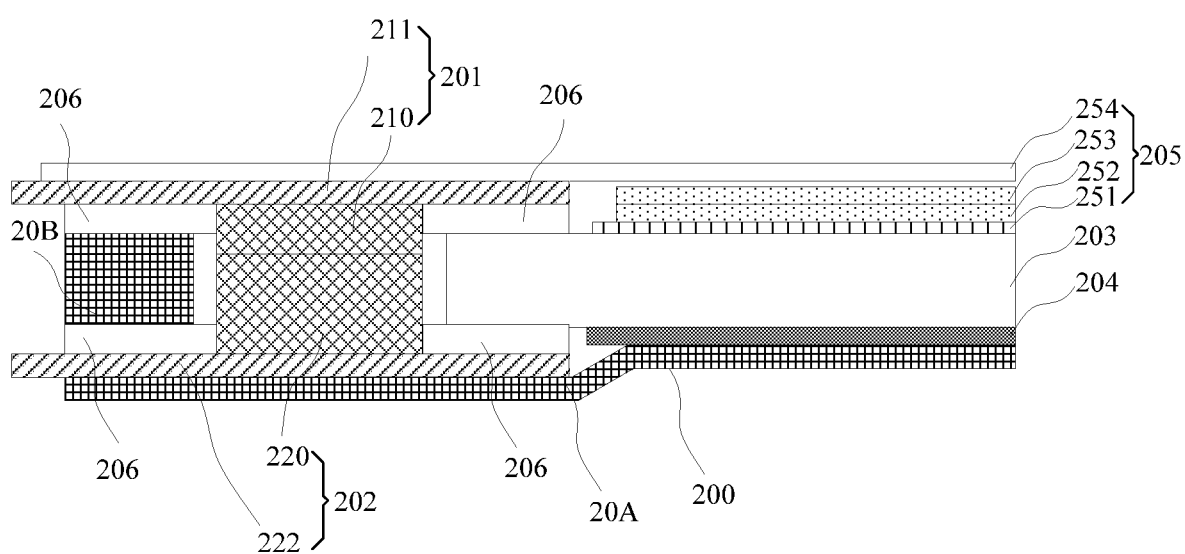
FIG. 2A is a schematic structural diagram of a backlight source according to an example.

FIG. 2A is a schematic structural diagram of a backlight source according to an example. As shown in FIG. 2A, the backlight source includes a first LED light bar 201, a second LED light bar 202, a light guide plate 203, a reflective plate 204 and an optical film 205. The light guide plate 203 has a light exiting surface and a bottom surface, which are disposed oppositely to each other. The optical film 205 is attached to the light exiting surface of the light guide plate 203, and the reflective plate 204 is attached to the bottom surface of the light guide plate 203. The first LED light bar 201 and the second LED light bar 202 are disposed on the same side of the light guide plate 203, and the first LED light bar 201 and the second LED light bar 202 are oppositely disposed.

Figure 2B:
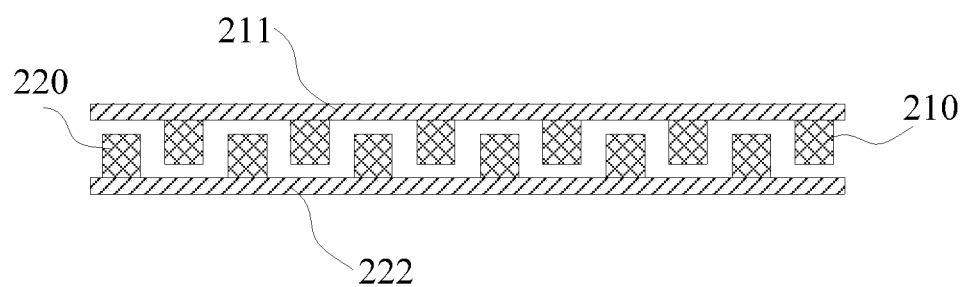
FIG. 2B is a partial structural diagram of a backlight source according to an example.

FIG. 2B is a partial structural diagram of the backlight source shown in FIG. 2A. Referring to FIG. 2B, the first LED light bar 201 includes a first circuit board 211 and a plurality of first light emitting units 210 disposed on the first circuit board 211 and spaced evenly, the second light emitting light bar 202 includes a second circuit board 222 and a plurality of second light emitting units 220 disposed on the second circuit board 222 and spaced evenly, the first circuit board 211 and the second circuit board 222 are disposed in parallel with each other and are disposed in parallel with the light exiting surface of the light guide plate 203, the first light emitting units 210 and the second light emitting units 220 are located between the first circuit board 211 and the second circuit board 222, and the plurality of the first light emitting units 210 and the plurality of the second light emitting units 220 are alternately disposed in an arrangement direction of the plurality of the first light emitting units 210.

As shown in FIG. 2B, the number of light emitting units on the first LED light bar 201 and the number of light emitting units on the second LED light bar 202 may be the same. In other implementations, the number of the light emitting units on the first LED light bar 201 and the number of the light emitting units on the second LED light bar 202 may differ by one. For example, the number of the light emitting units on the first LED light bar 201 is larger than the number of the light emitting units on the second LED light bar 202 by one, or the number of the light emitting units on the first LED light bar 201 is less than the number of the light emitting units on the second LED light bar 202 by one. Only in the above cases, it can be ensured that the plurality of first light emitting units 210 and the plurality of second light emitting units 220 are alternately arranged.

In one or more embodiments, the first circuit board 211 and the second circuit board 222 are both flexible printed circuits (FPC) 211, and the first light emitting unit 210 and the second light emitting unit 220 are both LED units. In this implementation manner, the light bar is defined to use the FPC as a substrate, which is because this manufacturing process is mature on one hand, and the manufacturing requirements of the LED light bar may be satisfied on the other hand.

In one or more embodiments, the light emitting units are soldered to the FPC through an SMT process. The SMT process is an existing mature process, and manufacturing the LED light bar by this process is convenient for fabrication and implementation.

In one or more embodiments of the present disclosure, the first light emitting unit 210 may be in contact with the second circuit board 222, and the second light emitting unit 220 may be in contact with the first circuit board 211, because such design can ensure the thickness of the backlight source to be minimized. However, it is worth noting that, due to the welding process and the influence of surface flatness of the FPC, the first LED light bar 201 and the second LED light bar 202 cannot be completely engaged together, but a gap exists, for example, as shown in FIG. 2B. Of course, the structure shown in FIG. 2B may also be achieved by design, that is, each of the first light emitting units 210 keeps a certain distance from the second circuit board 222, and each of the second light emitting units 220 keeps a certain distance from the first circuit board 211. Specifically, it can be achieved by designing a frame size of the backlight source, which will not be repeated herein.

Figure 3:
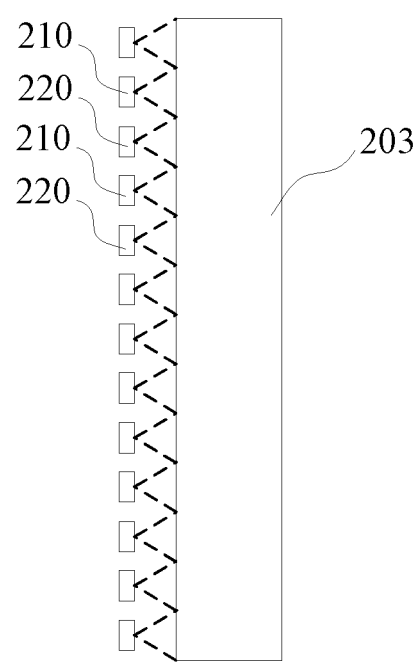
FIG. 3 is a schematic diagram of illumination of an LED light bar according to an example.

FIG. 3 is a schematic diagram of the illumination of the LED light bar shown in FIG. 2A and FIG. 2B. Referring to FIG. 3, the interval between the first light emitting unit 210 and the second light emitting unit 220 is small, so no dark area exists when the first light emitting unit 210 and the second light emitting unit 220 illuminate the light guide plate 203 at the same time. Further, when the interval between the first light emitting unit 210 and the second light emitting unit 220 is sufficiently small, the interval between the light bar and the light guide plate 203 may be reduced. Since the interval between the light bar and the light guide plate 203 becomes small, the liquid crystal display may obtain a narrower border when using the backlight source, thereby achieving a narrow border design, if only it ensures that there is no dark area when the first light emitting unit 210 and the second light emitting unit 220 illuminate the light guide plate 203.

Therefore, the interval between the first LED light bar 201 and the second LED light bar 202 and the light guide plate is set according to actual conditions. For example, the interval between the first LED light bar 201 and the second LED light bar 202 and the light guide plate is designed to be a minimum interval in the condition that the light guide plate does not have a dark area when the first light emitting unit 210 and the second light emitting unit 220 illuminate the light guide plate 203. The interval between the light bar and the light guide plate 203 refers to the distance between the light exiting surface of the light emitting unit in the light bar and the side surface of the light guide plate 203.

In one or more embodiments, both the first light emitting unit 210 and the second light emitting unit 220 may be implemented by adopting a combination of a color LED and fluorescent powder, for example, using a combination of a blue LED and a yellow fluorescent powder to generate white light, or using a combination of an ultraviolet or near ultraviolet LED and RGB fluorescent powder to produce white light. Alternatively, the first light emitting unit 210 and the second light emitting unit 220 may be implemented by using LEDs of different colors to be mixed. For example, a white LED integrated by RGB (red, green, and blue) three color LEDs, or separate RGB three color LEDs to be mixed are adopted to produce white light.

Further, the first LED light bar 201 and the second LED light bar 202 may further include a reflective lampshade, the reflective lampshade is disposed between the two light bars, and the first light emitting unit 210 and the second light emitting unit 220 are located between the lampshade and the light guide plate 203, such that the reflective 1 lampshade design may improve the light utilization of the light emitting unit.

In one implementation of the present disclosure, an interval of any two adjacent first light emitting units 210 or an interval of any two adjacent second light emitting units 220, i.e., an interval of two adjacent light emitting units on any one of the light bars, is 0.4-0.6 mm. The light bars designed with such interval may be manufactured by using the current light bar manufacturing process, and the actual interval of adjacent light emitting units is only 0.2-0.3 mm after adopting the backlight source design provided by the present disclosure, which may ensure the backlight evenness of the backlight source.

Illustratively, an interval of any two adjacent first light emitting units 210 or an interval of any two adjacent second light emitting units 220 is 0.5 mm, which may not only meet the requirements of even backlight and narrow border, but also ensure that the manufacturing process is easy.

In one or more embodiments, an interval between the first light emitting unit 210 and the second light emitting unit 220 that are adjacent is 0-0.2 mm.

In this implementation, the interval between the first light emitting unit 210 and the second light emitting unit 220 that are adjacent is defined as 0-0.2 mm. By defining a sufficiently small interval of the light emitting units, there will be no dark area even when the light bar is quite near to the light guide plate 203, which may effectively reduce the width of the border, thus achieving a narrow border design.

In an implementation manner of the present disclosure, the LEDs in both the first light emitting unit 210 and the second light emitting unit 220 are side light emitting LEDs, that is, the light emitted by the LED is in parallel with the circuit board (or the light exiting surface of the light guide plate). Since the first LED light bar and the second LED light bar need to be disposed opposite to each other, that is, sides of the first LED bar and the second LED bar on which light emitting units are provided are opposite to each other, and light emitting units on the two light bars are arranged in an alternate manner, so that the two light bars may be engaged in a mutually interlocking manner. At this time, side edges of respective light emitting units on the light bar are directed toward the light guide plate, so that the using of the side-light-emitting LEDs may ensure that the light bars provide sufficient light source to the light guide plate. In addition, side-light-emitting LEDs are used in the backlight source of the small-sized liquid crystal display to manufacture the light bar, therefore, the design of the present disclosure makes the backlight source design suitable for a small-sized liquid crystal display.

In an implementation manner of the present disclosure, the first light emitting unit 210 and the second light emitting unit 220 may be the same light emitting unit. The same light emitting unit is used to manufacture the light bar, which ensures that the brightness of every LED is equal, so that the brightness of the backlight provided by the backlight source is more even. In one or more embodiments, the same light emitting unit means that structures of the two light emitting units (the light emitting unit structure is as described above) are the same, and the LEDs in the light emitting unit are also the same (for example, LEDs of the same type being used).

In an implementation of the present disclosure, the light guide plate 203 may be made of polymethyl methacrylate (PMMA) or transparent polycarbonate (PC) material.

Exemplarily, the light guide plate 203 is a wedge-shaped light guide plate or a flat plate-shaped light guide plate. Both of the above-mentioned light guide plates may meet the requirements of the present disclosure for the light guide plate, and since two types of light guide plates are provided, the backlight source may be manufactured in a variety of options.

In an implementation of the present disclosure, the reflective plate 204 may be a metal reflective plate, such as an aluminum reflective plate or a silver reflective plate. The reflective plate made of the above-mentioned metal material may ensure the reflectance of light which is transmitted from the bottom surface of the light guide plate 203.

In one implementation of the present disclosure, as shown in FIG. 2A, the optical film 205 may include a diffusion sheet 251, a lower prism sheet 252 and an upper prism sheet 253 sequentially laminated on the light exiting surface of the light guide plate 203. By providing the diffusion sheet, the lower prism sheet, and the upper prism sheet on the light exiting surface of the light guide plate, the light emitted out from the light guide plate is diffused and brightened, thereby satisfying the backlight requirement of the liquid crystal display. The composition of the optical film 205 is merely an example. In other implementations, the optical film 205 may also be in other combinations, for example, upper and lower diffusion sheets are disposed.

In one or more embodiments, the diffusion sheet 251 may be a three-layer structure diffusion sheet, that is, an antistatic layer, a polyethylene terephthalate (PET) layer, and a diffusion layer are sequentially arranged from bottom to top. The lower prism sheet 252 and the upper prism sheet 253 may have a structure including a PET layer and a resin layer (for example, acrylic resin), and the resin layer is provided with an edge to realize the function of the prism.

Optionally, the optical film 205 may further include a light shielding sheet 254 disposed on the upper prism sheet 253. By further providing a light shielding sheet on the upper prism sheet, the light shielding sheet has a function of controlling the brightness of the backlight, so as to meet the backlight requirement of the liquid crystal display. In one or more embodiments, the light shielding sheet 254 may be made of PET.

In an implementation manner of the present disclosure, the backlight source further includes a frame body 200. The reflective plate 204, the first LED light bar 201 and the second LED light bar 202 are all fixed on the frame body 200. The frame body is used to fix the light bar, the light guide plate and every optical films of the backlight source, thereby realizing the module design of the backlight source.

In one or more embodiments, the frame body 200 may be a plastic frame. The plastic frame has good strength and light weight.

As shown in FIG. 2A, the frame body 200 includes a first frame body 20A and a second frame body 20B, the reflective plate 204 and the second circuit board 222 are disposed on the first frame body 20A; and the second frame 20B is disposed between the first circuit board 211 and the second circuit board 222. In this implementation, by providing the frame body 200 as two separate parts, it is ensured that both the first circuit board 211 and the second circuit board 222 may extend outward to connect the driving circuit. Besides, such design of the frame body may provide a support function for the backlight source.

In one or more embodiments, the first frame body 20A is located at the lowest position of the entire backlight source, for carrying the respective film layers. Specifically, the first frame body 20A may be of a plate shape design. The second frame body 20B is disposed between the first circuit board 211 and the second circuit board 222 and away from the light exiting sides of the first light emitting unit 210 and the second light emitting unit 220, for supporting the first LED light bar 201. The second frame body 20B may be of a strip-shaped design.

In an implementation of the present disclosure, the first LED light bar 201 and the second LED light bar 202 are fixed to the frame body 200 by glue 206. The light bar is fixed by the glue, which facilitates the assembly of the backlight source. In one or more embodiments, the glue 206 may be FPC glue.

In the structure shown in FIG. 2A, one end of the first circuit board 211 and one end of the second circuit board 222 are fixed to the second frame body 20B by glue 206. The other end of the first circuit board 211 and the other end of the second circuit board 222 are fixed on the light guide plate 203 by glue 206.

The fixing manner of the first circuit board 211 and the second circuit board 222 shown in FIG. 2A is only an example. In other implementation manners, the glue 206 above the second circuit board 222 may also be set to be below the second circuit board 222, thereby fixing the second circuit board 222 to the first frame body 20A.

The backlight source provided by the present disclosure includes two light bars, i.e., the first LED light bar and the second LED light bar disposed opposite to each other, each of the first LED light bar and the second LED light bar includes a plurality of light emitting units disposed and spaced evenly, and the light emitting units of the first LED light bar and the light emitting unit of the second LED light bar are alternately arranged, such that an interval of adjacent light emitting units in the present disclosure is reduced to a half of that in the related art. Besides, since the alternately arranged light emitting units are respectively disposed on the two light bars, as for any one of the light bars, the interval of the light emitting units on the light bar actually does not change, that is, it can be realized with no requirement of improvement of the light bar manufacturing process. Therefore, it solves the problem in the related art that an interval between adjacent light emitting units is relatively large that leads, when the light emitted out from the LED light bar enters the light guide plate, an apparent dark area appears. The evenness of the light emitted out from the backlight source is improved, and the display effect of the LCD is improved.

Figure 4:
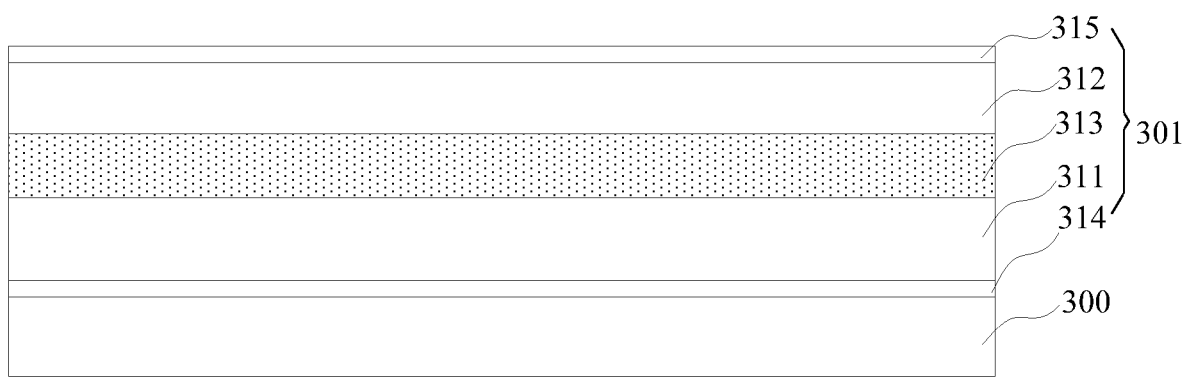
FIG. 4 is a schematic structural diagram of a liquid crystal display according to an example.

FIG. 4 is a schematic structural diagram of a liquid crystal display according to an example. Referring to FIG. 4, the liquid crystal display includes a backlight source 300 and a display panel 301. The backlight source 300 is the backlight source illustrated in FIGS. 2A and 2B.

In one or more embodiments, the display panel 301 includes an array substrate 311 and a color filter substrate 312 that form a cell assembly, a liquid crystal layer 313 disposed between the array substrate 311 and the color filter substrate 312, and a lower polarizer 314 disposed on the array substrate 311 and an upper polarizer 315 disposed on the color filter substrate 312. The structure of the display panel 301 shown in FIG. 4 is merely an example, and the structure of the display panel 301 in the present disclosure is not limited thereto.

The following is a brief introduction of the array substrate 311 and the color filter substrate 312. The structure of the array substrate 311 mainly includes a base substrate, a thin film transistor (TFT) array disposed on the base substrate, and a pixel electrode layer disposed on the TFT array. In one or more embodiments, the TFT array includes TFTs arranged in an array. The TFT may be a top gate TFT or a bottom gate TFT. The bottom gate TFT is taken as an example, and its structure includes a gate electrode, a gate insulating layer, an active layer, a source-drain electrode and a protective layer which are sequentially disposed on the base substrate. The structure of the color filter substrate 312 mainly includes a substrate, a color film layer, and a black matrix layer.

The backlight source provided by the present disclosure includes two light bars, i.e., the first LED light bar and the second LED light bar disposed opposite to each other, each of the first LED light bar and the second LED light bar includes a plurality of light emitting units disposed and spaced evenly, and the light emitting units of the first LED light bar and the light emitting unit of the second LED light bar are alternately arranged, such that an interval of adjacent light emitting units in the present disclosure is reduced to a half of that in the related art. Besides, since the alternately arranged light emitting units are respectively disposed on the two light bars, as for any one of the light bars, the interval of the light emitting units on the light bar actually does not change, that is, it can be realized with no requirement of improvement of the light bar manufacturing process. Therefore, it solves the problem in the related art that an interval between adjacent light emitting units is relatively large that leads, when the light emitted out from the LED light bar enters the light guide plate, an apparent dark area appears. The evenness of the light emitted out from the backlight source is improved, and the display effect of the LCD is improved.

In a disclosed embodiment, the backlight source includes a first LED light bar and a second LED light bar disposed opposite to each other, each of the first LED light bar and the second LED light bar includes a plurality of light emitting units disposed and spaced evenly, and the light emitting units of the first LED light bar and the light emitting unit of the second LED light bar are alternately arranged, such that an interval of adjacent light emitting units in the present disclosure is reduced to a half of that in the related art. Besides, since the alternately arranged light emitting units are respectively disposed on two light bars, as for any one of the light bars, the interval of the light emitting units on the light bar actually does not change, that is, no improvement of the light bar manufacturing process is required. Therefore, it solves the problem in the related art that an interval between adjacent light emitting units is relatively large that leads, when the light emitted out from the LED light bar enters the light guide plate, an apparent dark area appears. The evenness of the light emitted out from the backlight source is improved, and the display effect of the liquid crystal display is improved.

In an implementation manner of the present disclosure, the first circuit board and the second circuit board are both flexible circuit boards, and both the first light emitting unit and the second light emitting unit are light emitting diode units.

In this implementation, the light bar is defined to use a flexible circuit board as a substrate, it is because the manufacturing process is mature on one hand, and the manufacturing requirements of the LED light bar may be satisfied on the other hand.

In another implementation manner of the present disclosure, each of an interval of any two adjacent first light emitting units and an interval of any two adjacent second light emitting units is 0.4-0.6 mm.

In this implementation, the interval of the two light emitting units on any one of the light bars is defined, and the light bars designed with the interval can be manufactured by using the current light bar manufacturing process. Besides, the actual interval between adjacent light emitting units is only 0.2-0.3 mm by adopting the backlight source design provided by the present disclosure, which can ensure the backlight evenness of the backlight source.

In another implementation manner of the present disclosure, an interval between the first light emitting unit and the second light emitting unit that are adjacent is 0-0.2 mm.

In this implementation, the interval between the first light emitting unit and the second light emitting unit that are adjacent is defined to be 0-0.2 mm. By defining a sufficiently small interval between light emitting units, there will be no dark area even when the light bar is quite close to the light guide plate, so that the width of a border may be effectively reduced, thereby achieving a narrow border.

In another implementation manner of the present disclosure, light emitting diodes in both the first light emitting units and the second light emitting units are side-light-emitting light emitting diodes.

In this implementation, since the first LED bar and the second LED bar are disposed opposite to each other, that is, sides of the first LED bar and the second LED bar on which light emitting units are provided are opposite to each other, and light emitting units on the two light bars are arranged in a crosswise manner, so that the two light bars are engaged in a mutually interlocking manner. At this time, side edges of respective light emitting units on the light bar are directed toward the light guide plate, so that using the side-light-emitting light emitting diodes may ensure that the light bars provide sufficient light source to the light guide plate. In addition, side-light-emitting light emitting diodes are used in the backlight source of the small-sized liquid crystal display to manufacture the light bar, therefore, the design of the present disclosure makes the backlight source design suitable for a small-sized liquid crystal display.

In another implementation manner of the present disclosure, the first light emitting units and the second light emitting units are the same light emitting units.

In this implementation manner, the same light emitting unit is used to manufacture the light bars, so that the light emitting brightness of every light emitting unit is equal, so that the brightness of the backlight provided by the backlight source is more even.

In another implementation manner of the present disclosure, the optical film includes a diffusion sheet, a lower prism sheet and an upper prism sheet sequentially laminated on the light exiting surface of the light guide plate.

In this implementation, by providing the diffusion sheet, the lower prism sheet, and the upper prism sheet, the light emitted out from the light guide plate is diffused and brightened, thereby satisfying the backlight requirement of the liquid crystal display.

In another implementation manner of the present disclosure, the optical film further includes a light shielding sheet disposed on the upper prism sheet.

In this implementation, the brightness of the backlight is controlled by providing the light shielding sheet, to meet the backlight requirement of the liquid crystal display.

In another implementation manner of the present disclosure, the backlight source further includes a frame body, wherein the reflector, the first LED light bar and the second LED light bar are all fixed on the frame body.

In an implementation manner, the light bar, the light guide plate, and respective optical films of the backlight source are fixed by the frame body, thereby implementing the module design.

In another implementation manner of the present disclosure, the first LED light bar and the second LED light bar are fixed to the frame body by glue.

In this implementation, the light bar is fixed by glue, which facilitates the assembly of the backlight source.

In another implementation manner of the present disclosure, the frame body includes a first frame body and a second frame body, the reflective plate and the second circuit board are disposed on the first frame body; and the second frame is disposed between the first circuit board and the second circuit board.

In this implementation, by providing the frame body as two separate parts, it is ensured that both the first circuit board and the second circuit board may extend outward to connect the driving circuit. Besides, design of the frame body may provide a support function for the backlight source.

In another implementation manner of the present disclosure, the light guide plate is a wedge-shaped light guide plate or a flat plate-shaped light guide plate.

In this implementation, two types of light guide plates are provided, so that the backlight source may be manufactured in a variety of options.

The technical solutions provided by the embodiments of the present disclosure may include following beneficial effects. The backlight source provided by the present disclosure includes two light bars, i.e., the first LED light bar and the second LED light bar disposed opposite to each other, each of the first LED light bar and the second LED light bar includes a plurality of light emitting units disposed and spaced evenly, and the light emitting units of the first LED light bar and the light emitting unit of the second LED light bar are alternately arranged, such that an interval of adjacent light emitting units in the present disclosure is reduced to a half of that in the related art. Besides, since the alternately arranged light emitting units are respectively disposed on the two light bars, as for any one of the light bars, the interval of the light emitting units on the light bar actually does not change, that is, it can be realized with no requirement of improvement of the light bar manufacturing process. Therefore, it solves the problem in the related art that an interval between adjacent light emitting units is relatively large that leads, when the light emitted out from the LED light bar enters the light guide plate, an apparent dark area appears. The evenness of the light emitted out from the backlight source is improved, and the display effect of the LCD is improved.

Those skilled in the art will readily think of other embodiments of the present disclosure after considering the specification and practicing the invention disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are to be considered as illustrative only. The actual scope and spirit of the present disclosure are designated by the appended claims.

It should be understood that the present disclosure is not limited to precise structures described above and illustrated in the accompanying drawings. Various modifications and changes can be made without departing from the scope thereof. The scope of the disclosure is limited only by the appended claims.

What is claimed is:

1. A backlight source, comprising:
a first light emitting diode (LED) light bar, a second LED light bar, a light guide plate, a reflective plate, a frame body, and an optical film, wherein the light guide plate includes a light exiting surface and a bottom surface disposed oppositely to each other, the optical film is attached to the light exiting surface of the light guide plate, and the reflective plate is attached to the bottom surface of the light guide plate, wherein the reflective plate, the first LED light bar and the second LED light bar are all fixed on the frame body, and the frame body comprises a first frame body and a second frame body, wherein the reflective plate and a second circuit board are disposed on the first frame body, and the second frame body is disposed between a first circuit board and the second circuit board and the second frame body is away from exiting sides of a plurality of first light emitting units and a plurality of second light emitting units,
wherein the first LED light bar comprises the first circuit board and the plurality of first light emitting units disposed on the first circuit board and spaced evenly, the second LED light bar comprises the second circuit board and the plurality of second light emitting units disposed on the second circuit board and spaced evenly, the first circuit board and the second circuit board are disposed in parallel with each other and are disposed in parallel with the light exiting surface of the light guide plate, the plurality of first light emitting units and the plurality of second light emitting units are located between the first circuit board and the second circuit board, and the plurality of first light emitting units and the plurality of second light emitting units are alternately disposed in an arrangement direction of the plurality of the first light emitting units.

2. The backlight source according to claim 1, wherein light emitting diodes in both the first light emitting units and the second light emitting units are side-light-emitting light emitting diodes.

3. The backlight source according to claim 1, wherein the first light emitting units and the second light emitting units are the same light emitting units.

4. The backlight source according to claim 1, wherein the optical film comprises a diffusion sheet, a lower prism sheet, and an upper prism sheet sequentially laminated on the light exiting surface of the light guide plate.

5. The backlight source according to claim 4, wherein the optical film further comprises a light shielding sheet disposed on the upper prism sheet.

6. The backlight source according to claim 1, wherein the first LED light bar and the second LED light bar are fixed to the frame body by glue.

7. The backlight source according to claim 1, wherein a first interval between any two adjacent first light emitting units and a second interval between any two adjacent second light emitting units have a same width between 0.4 mm and 0.6 mm.

8. The backlight source according to claim 2, wherein an interval between the first light emitting unit and an adjacent second light emitting unit is less than or equal to 0.2 mm.

9. A liquid crystal display, comprising a backlight source that comprises:
a first light emitting diode (LED) light bar, a second LED light bar, a light guide plate, a reflective plate, a frame body, and an optical film, wherein the light guide plate includes a light exiting surface and a bottom surface disposed oppositely to each other, the optical film is attached to the light exiting surface of the light guide plate, and the reflective plate is attached to the bottom surface of the light guide plate, wherein the reflective plate, the first LED light bar and the second LED light bar are all fixed on the frame body, and the frame body comprises a first frame body and a second frame body, wherein the reflective plate and a second circuit board are disposed on the first frame body, and the second frame body is disposed between a first circuit board and the second circuit board and the second frame body is away from exiting sides of a plurality of first light emitting units and a plurality of second light emitting units,
wherein the first LED light bar comprises the first circuit board and the plurality of first light emitting units disposed on the first circuit board and spaced evenly, the second LED light bar comprises the second circuit board and the plurality of second light emitting units disposed on the second circuit board and spaced evenly, the first circuit board and the second circuit board are disposed in parallel with each other and are disposed in parallel with the light exiting surface of the light guide plate, the plurality of first light emitting units and the plurality of second light emitting units are located between the first circuit board and the second circuit board, and the plurality of first light emitting units and the plurality of second light emitting units are alternately disposed in an arrangement direction of the plurality of first light emitting units.

10. The liquid crystal display according to claim 9, wherein light emitting diodes in both the first light emitting units and the second light emitting units are side-light-emitting light emitting diodes.

11. The liquid crystal display according to claim 9, wherein the first light emitting units and the second light emitting units are the same light emitting units.

12. The liquid crystal display according to claim 9, wherein the optical film comprises a diffusion sheet, a lower prism sheet, and an upper prism sheet sequentially laminated on the light exiting surface of the light guide plate.

13. The liquid crystal display according to claim 12, wherein the optical film further comprises a light shielding sheet disposed on the upper prism sheet.

14. The liquid crystal display according to claim 9, wherein the first LED light bar and the second LED light bar are fixed to the frame body by glue.

15. The liquid crystal display according to claim 9, wherein a first interval between any two adjacent first light emitting units and a second interval between any two adjacent second light emitting units have a same width between 0.4 mm and 0.6 mm.

16. The liquid crystal display according to claim 9, wherein an interval between the first light emitting unit and an adjacent second light emitting unit is less than or equal to 0.2 mm.

17. A backlight source, comprising:
a first light emitting diode (LED) light bar, a second LED light bar, a light guide plate, a reflective plate, a frame body, and an optical film, wherein the light guide plate includes a light exiting surface and a bottom surface disposed oppositely to each other, the optical film is attached to the light exiting surface of the light guide plate, and the reflective plate is attached to the bottom surface of the light guide plate, wherein the reflective plate, the first LED light bar and the second LED light bar are all fixed on the frame body, wherein the frame body comprises a first frame body and a second frame body, wherein the reflective plate and a second circuit board are disposed on the first frame body, and wherein the second frame body is disposed between a first circuit board and the second circuit board and the second frame body is away from exiting sides of a plurality of first light emitting units and a plurality of second light emitting units, wherein the first LED light bar comprises the first circuit board and the plurality of first light emitting units disposed on the first circuit board and spaced evenly, the second LED light bar comprises the second circuit board and the plurality of second light emitting units disposed on the second circuit board and spaced evenly, the first circuit board and the second circuit board are disposed in parallel with each other and are disposed in parallel with the light exiting surface of the light guide plate, the plurality of first light emitting units and the plurality of second light emitting units are located between the first circuit board and the second circuit board, and the plurality of first light emitting units and the plurality of second light emitting units are alternately disposed in an arrangement direction of the plurality of the first light emitting units, and wherein each of the plurality of first light emitting units contacts a surface of the second circuit board and each of the plurality of second light emitting units contacts a surface of the first circuit board.

18. The backlight source according to claim 17, wherein a first interval between adjacent first light emitting units of the plurality of first light emitting units and a second interval between adjacent second light emitting units of the plurality of second light emitting units have a same width between 0.4 millimeters (mm) and 0.6 mm.

19. The backlight source according to claim 18, wherein a third interval between each first light emitting unit of the plurality of first light emitting units and an adjacent second light emitting unit of the plurality of light emitting units is less than or equal to 0.2 mm.

* * * * *